June 10, 1941.  W. H. DEGNON  2,244,941
INNER TUBE
Filed April 26, 1939  2 Sheets-Sheet 1

INVENTOR
WILLIAM H. DEGNON
BY
J Ralph Barrow
ATTORNEY

June 10, 1941. W. H. DEGNON 2,244,941
INNER TUBE
Filed April 26, 1939 2 Sheets-Sheet 2

INVENTOR
WILLIAM H. DEGNON
BY
J Ralph Barrow
ATTORNEY

Patented June 10, 1941

2,244,941

UNITED STATES PATENT OFFICE 2,244,941

INNER TUBE

William H. Degnen, Cuyahoga Falls, Ohio

Application April 26, 1939, Serial No. 270,171

2 Claims. (Cl. 152—341)

This invention relates to tubes for tire casings.

The life of a tire, aside from its capacity to resist the frictional tread wear, depends on the ability of the reinforcing cords thereof to resist fatigue caused by flexing, bending, and compression stresses to which they are continuously subjected while the tire is in service. Lowering the inflation pressure in the tire to obtain increased cushioning effect, besides increasing the rolling resistance of the tire and thereby reducing the power transmission efficiency, will proportionately increase the amount of flexing and other stresses in the cords, thereby hastening deterioration thereof and finally resulting in a fatigue break or fabric blowout in the tire carcass. Conversely, increasing the inflation pressure of the tire, while decreasing rolling resistance to increase power transmission efficiency and tending to reduce fatigue breaks and in turn fabric blowouts, correspondingly reduces the cushioning effect obtained with the lower inflation pressures.

A general object of this invention is to provide an improved inner tube for a tire casing which will produce in the tire the combination of the advantages of both high and low pressure tires.

A particular object of the invention is to provide a tube of the character described which will produce in a tire the advantages of a high pressure tire for minimum rolling resistance, efficient power transmission, greater ease in steering in the case of front wheel tires on a vehicle, and minimum tire failure caused by excessive flexing strain at the shoulder portions of the tire, etc., combined with the advantages of a low pressure tire for effective cushioning against road and other shocks, the effect being to cause maximum flexing in the tire casing to be distributed in the side walls of the tire inwardly of the ground contacting portion of the tire to adjacent the beads thereof.

Another object of the invention is to provide a tube for pneumatic tires having an inner low pressure zone and separate outer high-pressure zone, and in which maximum cushioning is obtainable with lower pressure in said inner zone than has been heretofore possible with tires having a single low pressure tube therein.

Another object of the invention is to provide a tube for pneumatic tires by means of which it is possible to decrease the width of the tread portion of tire and increase the rim width thereof without substantial inward buckling of said tread portion when the tire is under load, thereby making possible a stream lining effect particularly desirable in aeroplane tires.

Another object of the invention is to provide a safety tube for pneumatic tires in which when the outer high-pressure chamber of the tube becomes punctured the pressure in the inner low-pressure chamber thereof will continue to hold the tire beads against the rim flanges and also prevent complete collapse of the tire.

Another object of the invention is to provide a tube of the character described in which one zone may contain a heavy incompressible fluid, such as water, to supply added traction weight to the tire while another zone contains air or other medium at a relatively low pressure to provide cushioning in the tire.

These and other objects of the invention will be manifested from the following brief description and the accompanying drawings.

Figure 1:
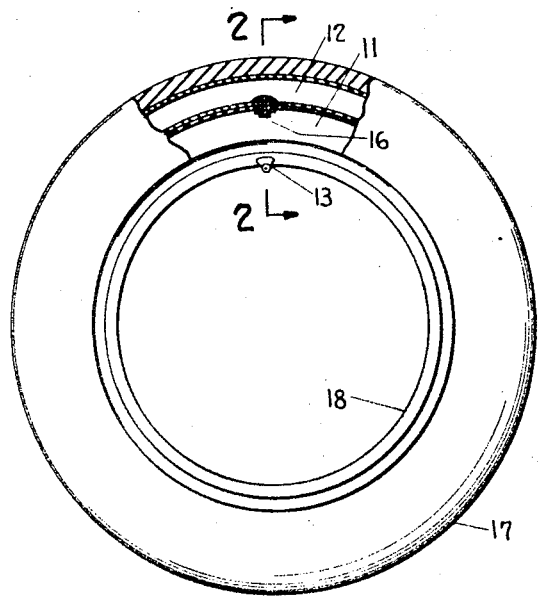
Figure 1 is a side elevation, partly broken away and in section, of a tube embodying the invention mounted with a tire on a rim.
Figure 2:
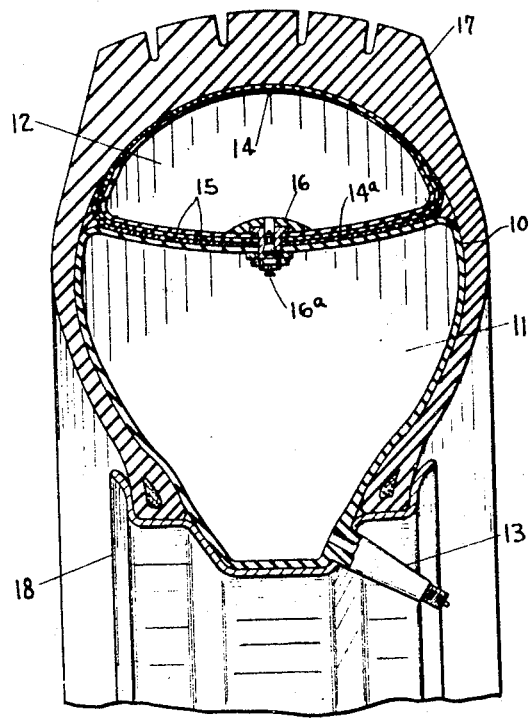
Figure 2 is a cross-section on line 2—2 of Figure 1.

Referring to Figures 1 and 2 of the drawings, the numeral 10 designates a tube having inner and outer hollow circumferential sections 11 and 12 to provide low and high pressure chambers, respectively. The inner section 11 may comprise a conventional rubber inner tube having a valve stem 13 thereon for the usual valve (not shown). The outer high-pressure section 12 preferably comprises an inner layer of rubber 14 and one or more outer layers 15 of flexible inelastic reinforcing material, such as square woven or bias cut cord fabric or wire mesh, vulcanized integral therewith to prevent substantial stretching of the same. The tube sections 11 and 12 may be vulcanized together to form a dividing wall 14ª, or they may be connected to each other only by a check valve 16, of known type, which normally allows flow of pressure fluid from section 11 to section 12, but is closed in service when the pressure in the latter is greater than that in section 11.

The tube 10 may be inserted in the usual tire 17 and assembled on conventional drop center rim 18, substantially as illustrated.

Tube 10 is inflated by first supplying high pressure fluid, such as air, through valve 13 so that both sections 11 and 12 become inflated to a predetermined high pressure. Next, the pressure is released from section 11, through valve 13, until a suitable low pressure for shock absorbing performance of the tire is obtained. Valve 16 prevents return of the high pressure fluid from section 12 to section 11, whereby a pressure differential is maintained between the two chambers.

Should a cut or puncture occur in the outer tubular section 12 to allow the fluid to escape therefrom, the dividing wall between the two sections will be forced outwardly by pressure in section 11 to seal valve 16 against the opposite wall of the tube and prevent passage of fluid from section 11. Thus the air or other fluid retained in the inner chamber will be sufficient to support the tire until the car can be safely stopped for a tire change. The reinforcing material in tubular section 12 is in contact with inner tire periphery and prevents such cut or puncture from becoming larger. To assure that the air will remain in the lower chamber the valve inside should be so arranged as to allow use of sufficient pressure in the lower chamber without permitting escape of air to the punctured high pressure chamber. If necessary, section 11 may be temporarily inflated to a higher pressure so that the car may be driven to a convenient stopping point for repair of the tire. The usual spring in the valve may be adjusted so that the valve will not open under a predetermined inflation pressure in the inner chamber or section sufficient to keep the tire inflated for the purposes of safety.

To completely deflate tube 10, valve 13 may first be actuated as will be understood, or the core thereof removed to deflate section 11. A stem 16ª in valve 16 may then be actuated by pressing the inner portion of the tube wall inwardly, thereby to deflate the high pressure section 12.

Figure 3:
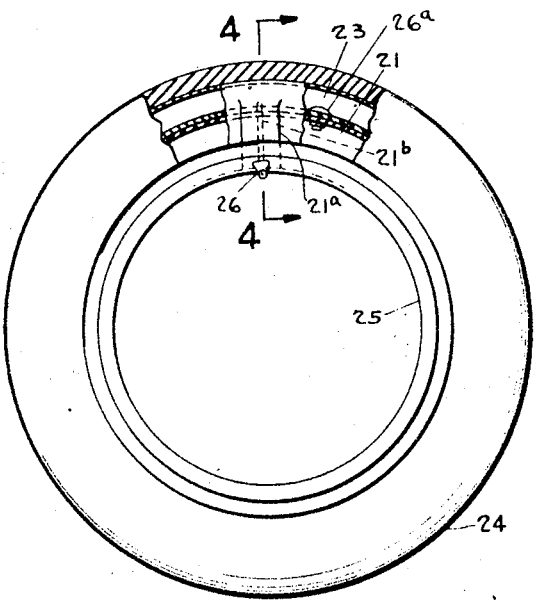
Figure 3 is a view, similar to Figure 1, of a modified form of the invention.
Figure 4:
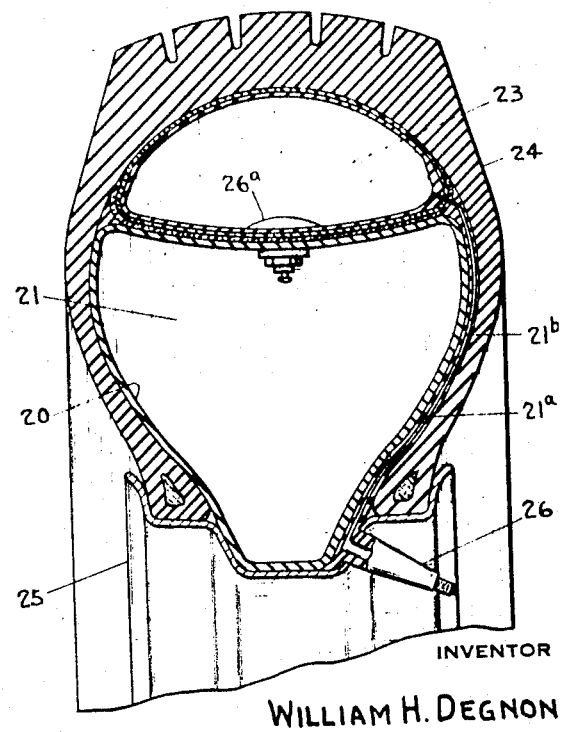
Figure 4 is a cross-section on line 4—4 of Figure 3.

In Figures 3 and 4 is shown a modified type of tube 20 comprising a hollow circumferential inner section 21, similar to section 11, and an outer hollow circumferential section 23, similar to section 12, the tube 20 being inserted in a tire 24 and assembled on a suitable rim 25, as before. Section 21 may be provided with a flat, hollow strip 21ª of rubber or like material integrally connected to one side thereof and extending inwardly of the tire, there being a valve stem 26 on the inner end of the strip adapted to be extended outwardly through rim 25. In the dividing wall 20ª between sections 21 and 23 there preferably is provided a pressure reducing valve 26ª, of known type. The arrangement is such that when fluid, such as air, is supplied through valve 26 to inflate section 23 at a predetermined high pressure the reducer 26ª permits fluid at a predetermined lower pressure to pass from section 23 to inflate section 21. If desired, section 23 and the strip 21ª may be vulcanized or otherwise attached to section 21.

In the case of tractor tires where good traction is such an important factor, outer section 23 may be filled with water under pressure thereby adding weight to the tire and still maintaining relatively high pressure, because of the incompressibility of the water, adjacent the shoulder zones of the tire for the purposes described.

Many advantages are attained by having an outer high pressure traction zone and an inner low pressure shock-absorbing zone in a pneumatic tire tube. Some of these advantages are the reduction of rolling resistance, and more efficient power transmission in service, and hence reduced transportation cost, greater ease in steering in the case of the front tires of a vehicle, and greater safety due to the reduction of tire failures caused by excessive flexing at the shoulder portions of the tire. In the structures described, since the outer high pressure zone of the tire floats on the inner low pressure section, the size of the traction wave set up in the rolling tire and the circumferential distortion are greatly minimized, thus limiting internal friction within the tire section adjacent the area of contact thereof with the road and materially limiting the damaging heat generated by the same. Tires w .n the improved tube will be less likely to skid, because of the comparative rigidity in the tread portion thereof. Maximum flexing in the tire casing is distributed in the side walls thereof inwardly of the ground contacting portion of the tire to adjacent the beads thereof, which can be compounded for effective flexing without regard to abrasive wear.

Figure 5:
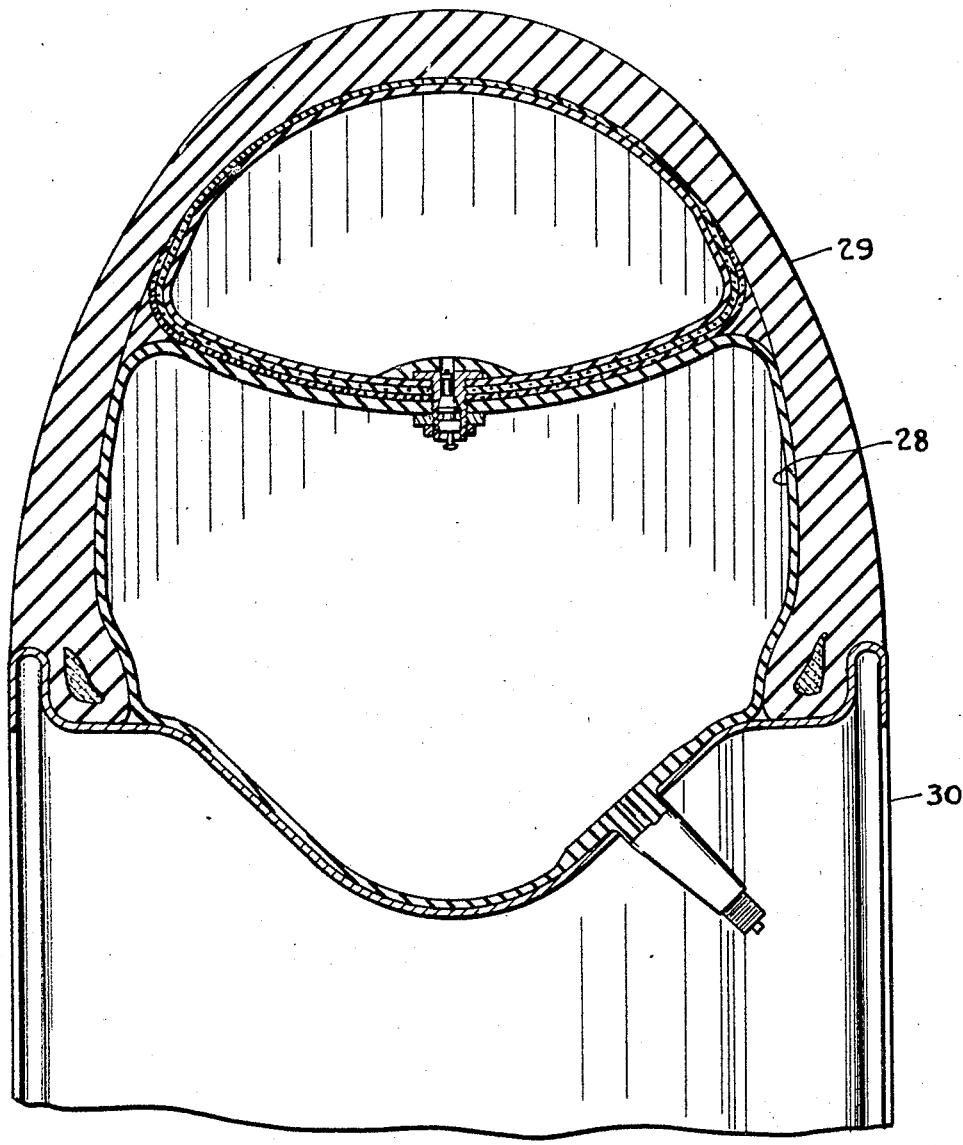
Figure 5 is a view, similar to Figure 2, showing the application of the invention to gain stream lining effect, for aeroplane tires for example.

Because the present structure provides a relatively rigid outer zone in the tire, due to the high pressure fluid therein, it is possible to decrease the width of the tire tread and increase the rim width, thus producing a stream lined effect on the tire. This is particularly desirable in aeroplane tires, as illustrated in Figure 5 is which 28 is a tube, similar to tube 10 in Figures 1 and 2, and 29 is a tire having a relatively narrow tread portion, the tire being mounted on a relatively wide rim 30. The relatively rigid outer zone floating on the low pressure inner zone or tube prevents inward buckling of the tread portion of the tire, thereby preventing excessive shoulder wear, decreased fabric tension and resulting in better non-skid.

With the present constructions it is possible to incorporate self-sealing puncture compounds into the outer tube section, so that the usual tendency of such compounds to travel in the direction of the tire beads when the tire is stationary will be materially obviated.

Thus has been provided an improved tube for pneumatic tires, which in addition to features enumerated makes possible the use of a lighter tire by eliminating the usual breaker strips or one or more extra fabric plies, since road shock and flexing of the shoulder portions of the tire are distributed down the side walls of the tire, as well as being distributed over a greater portion of the circumference of the tire.

Modifications of the invention may be resorted to without departing from the spirit thereof or the scope of the appended claims.

What is claimed is:

1. In combination a pneumatic tire casing having spaced beads on its inner periphery, and a rim on which said beads seat, said casing having a tread portion terminating in shoulders at the sides of the outer periphery thereof, an inner tube construction of thin flexible material for contacting the inner wall of said casing throughout the area thereof and for contacting the outer periphery of said rim between the beads, said inner tube construction having a flexible dividing wall extending across the same to the inner side wall of the tire casing outwardly of the median line of the casing and a substantial distance inwardly of said shoulders at each side of said tire to divide said tube construction into outer and inner circumferential chambers, the wall of the tube and the dividing wall, about said outer chamber, being inextensible, said outer chamber being filled with a fluid medium under relatively high pressure whereby the outer peripheral portion of the casing outwardly of said median line is comparatively rigid and the inner chamber being filled with a fluid medium at a relatively low pressure whereby the inner portion of the casing inwardly of said median line is comparatively yielding so that flexing of the tire under load is minimized about the outer chamber at the tread and the portions of the tire adjacent the shoulders of the casing, but about the inner chamber the inner portions of the tire will flex with comparative ease, the outer chamber when the tire is inflated being generally oval or elongate in cross-section with its major axis extending axially of the tire and through the side walls of the tire a substantial distance inwardly of the shoulders.

2. The combination as set forth in claim 1, with a dividing wall having therein a check valve opening into the outer chamber, and means at the inner periphery of the inner tube for inflating said tube whereby both chambers may be inflated to desired high pressure and then the inner chamber deflated to a desired low pressure without deflating the outer chamber.

WILLIAM H. DEGNON.